Dec. 25, 1962    J. A. SAFFIR    3,070,381
DENTAL INSTRUMENT
Filed Aug. 16, 1960

INVENTOR.
JACOB A. SAFFIR
BY
ATTORNEY

Dec. 25, 1962

J. A. SAFFIR
DENTAL INSTRUMENT 3,070,381

Filed Aug. 16, 1960

INVENTOR.
JACOB A. SAFFIR

BY

ATTORNEY

United States Patent Office 3,070,381
Patented Dec. 25, 1962

3,070,381
DENTAL INSTRUMENT
Jacob A. Saffir, Los Angeles, Calif., assignor to The Dentists' Supply Company of New York, York, Pa., a corporation of New York
Filed Aug. 16, 1960, Ser. No. 49,884
6 Claims. (Cl. 279—102)

This invention relates to drilling tools and, more particularly, to dental drillos or handpieces and the tool holding elements or chucks thereof.

It is an object of the invention to provide an improved chuck for holding a drill or bur firmly, relative to the rotor of a dental handpiece.

Other objects of this invention are to provide a chuck for a dental handpiece which is of simple construction, has long life, is relatively inexpensive to manufacture, and is easily removable from and replaceable within the dental handpiece.

A chuck embodying the invention in a number of preferred forms and embodiments now will be described with reference to the accompanying drawings, wherein similar elements are designated by like numerals.

Figure 1:
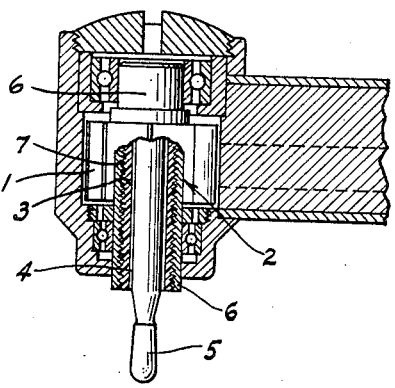
FIG. 1 is a vertical sectional view of a chuck embodying the invention and shown in operative position within the rotor of a dental contra angle handpiece.

The instrument shown in FIG. 1 is a turbine type contra-angle dental handpiece having a rotor 1 provided with a chuck 2. Chuck 2 comprises a rubber, rubberlike, or flexible plastic sleeve 3 surrounding a sectional metal lining 4 which receives and holds the shank of the drill or bur 5 within a substantially cylindrical opening 10. The rubber-like sleeve 3 fits into the hollow metallic shaft 6 of the rotor of the handpiece and comes to rest against the serrations on threads 7 within the hollow interior of aforesaid shaft 6. The nature of the physical properties of the material of liner sleeve 3 is such as to cause the outer surface of sleeve 3 to engage firmly against the serrations 7 and preferably conforming thereto in shape. This engagement is increased when the shank of drill or bur 5 is positioned therein. By design, the diameter of the metal sleeve lining 4, which preferably is sectional, is slightly less than the diameter of the shank of drill or bur 5. Placing the shank of drill or bur 5 in position within the metal sleeve 4 causes pressure against the metal lining 4 which, as it expands, causes the rubber layer 3 to be compressed and thereby forced more firmly into engagement with the serrations 7, thereby effecting an engagement similar to that shown in FIG. 1. Although the preferred embodiments employ serrations or threads as retention means in the interior of shaft 6 to hold the chuck firmly therein, and particularly against axial movement, roughening of the interior of shaft 6 or the use of a few indentations on the interior wall of the shaft will also serve to enhance holding the chuck satisfactorily.

Figure 2:
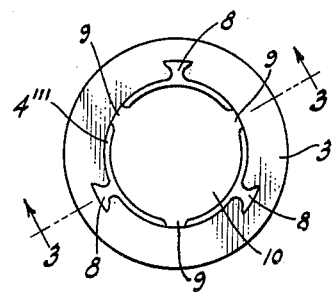
FIG. 2 is a horizontal, enlarged plan or end view of a chuck of the type shown in FIG. 1.

In FIG. 2, the embodiment of chuck shown therein has the compressible tubular portion or sleeve 3 lined with a three section metallic lining arrangement comprising juxtapositioned elements 4', 4", and 4''', the sections having small longitudinal spaces 9 between them. To hold sections 4', 4", and 4''' in place within sleeve 3, anchors 8 are formed on the sections and are imbedded within the walls of the tubular sleeve 3. These anchors may be of any suitable shape but if shaped so as to have enlarged outer ends, such as inverted cones, they will offer highly effective resistance to forces tending to dislodge the metallic elements from liner sleeve 3. Inasmuch as the interior opening of the chuck is of a slightly smaller diameter than the outer diameter of the shank of a drill or bur, the insertion of such shank will force these metallic sections further apart radially with the resultant compression of the rubber sleeve 3. This compression of liner sleeve 3 has two beneficial results; one is to press liner 3 into firmer engagement with the interior of shaft 6, and the other is to force the sections 4', 4" and 4''' into very firm gripping engagement with the shank of the drill or bur 5. When the drill is removed, the tension is released. The rubber-like sleeve then resumes its normal shape and size and the metallic sections return to their original position.

The metallic lining sleeve portions 4', 4" and 4''' of the chuck can be of any metal strong enough to withstand the pressure necessary to hold the drill. Materials contemplated are stainless steels, conventional steels, brass, copper, iridio-platinum, aluminum, silver, nickel, or German silver. The metallic surface of the metal chuck sections 4', 4" and 4''', which contact and hold the shank of the drill or bur, need not be, and preferably are not, highly polished. A dull surface, or one roughened even slightly, will grip better than a smooth one and the holding power of this metallic liner arrangement of the chuck can be increased by such means as perforations or the creation of relatively low ribs, such as ribs 12 in FIG. 7, may be employed. For most types of contemplated gripping, simply leaving the drill shank-engaging surfaces of the metal liner elements of the chuck unpolished is sufficient.

Figure 3:
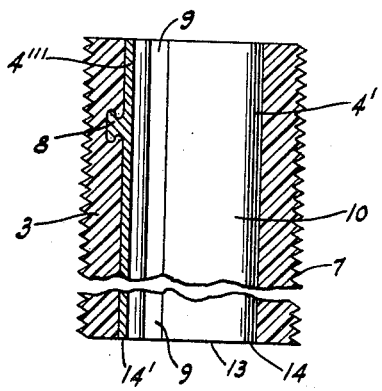
FIG. 3 is a vertical sectional view of a chuck, as seen on the line 3—3 in FIG. 2.

FIG. 3 comprises a vertical section of the chuck shown in FIG. 2, as seen on the line 3—3 of FIG. 2. The lower end 13 of the opening 10 is the one into which the shank of the drill or bur 22 is inserted. The ends 14 and 14' of the metallic lining members 4''' and 4' preferably are flush at the ends with the end of the rubber sleeve portion 3.

Figure 4:
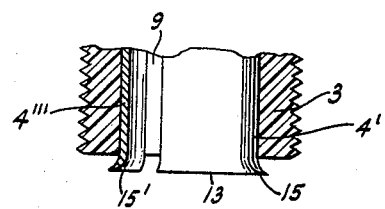
FIG. 4 is a fragmentary vertical sectional view of the bur-receiving end of a chuck.

In FIG. 4, the ends 15 and 15' of the metallic lining members 4''' and 4' are somewhat modified over the ends 14 and 14' of the lining members of FIG. 3, in that they extend somewhat below the end of the rubber sleeve 3 and are curved to facilitate the placing of a drill within the chuck.

Figure 5:
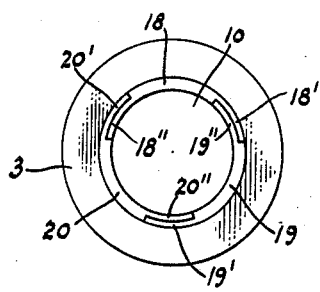
FIG. 5 is a plan or end view of another embodiment of chuck employing the principles of the invention.

In FIG. 5, the composite metallic inner lining sleeve is a further modification and is composed of three sections, 18, 19 and 20, each of which has extensions on opposite edges 18', 18"; 19', 19"; and 20' and 20", said extensions overlapping adjacent extensions of other sections, slidably, so as to permit radial expansion between the sections when a bur or drill shank is inserted therein.

Figure 6:
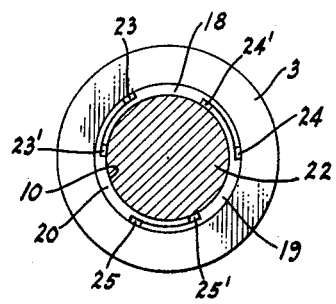
FIG. 6 is a view similar to FIG. 5 but showing the arrangement when a bur is positioned within the chuck.
Figure 7:
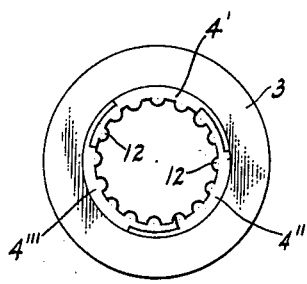
FIG. 7 is a plan or end view of still another embodiment of chuck employing ribbed drill-holding surfaces.

When the shank of a drill or bur 22 is inserted, as illustrated in FIG. 6, into the opening defined by the metallic lining sections, said sections must yield to accommodate it, whereby the sections 18, 19 and 20 move apart radially and create spaces 23, 23', 24, 24', and 25 and 25', thus slightly enlarging the circumference of the metallic inner sleeve sections but maintaining an even band of metal throughout. If desired, gripping of a shank of a dental tool by the interior surfaces of metallic members 18, 19 and 20 may be enhanced by providing the same with spaced longitudinal ribs 12, examples of which are illustrated in FIG. 7.

Figure 8:
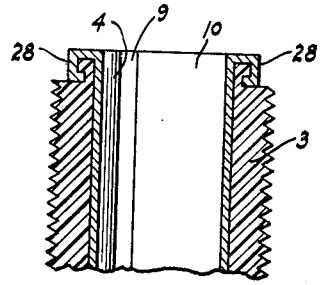
FIG. 8 is a fragmentary vertical sectional view of one embodiment of means on the interior of a chuck to secure certain elements thereof against longitudinal separative movement.

There are a number of ways of securing the metallic lining against the rubber sleeve. In FIG. 8, the metallic lining 4 is held in place by retention means created by bending the upper end of the metal into an L-shaped configuration 28, which is spun and crimped so as to grasp the rubber-like sleeve 3. Usually, making such a configuration on one end is sufficient, but both ends can be so treated.

Figure 9:
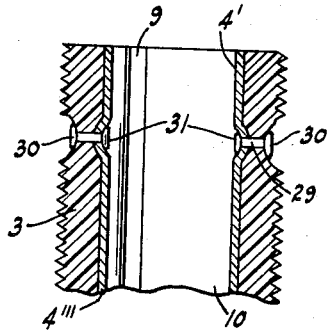
FIG. 9 is a fragmentary vertical sectional view of a portion of the chuck showing another embodiment of securing means for certain elements thereof.

In FIG. 9 another modification is illustrated which shows the metal sleeve 4 held in place by headed pins 29. The end 30 of the pin 29 is slightly recessed into the rubber-like sleeve 3 so as not to interfere with the serrations 7 within the shaft 6, as shown in FIG. 1. Similarly, the end 31 of the pin 29 is slightly recessed into the inner wall of metallic lining sleeve 4 so as not to interfere with the shaft of a drill or bur.

Figure 10:
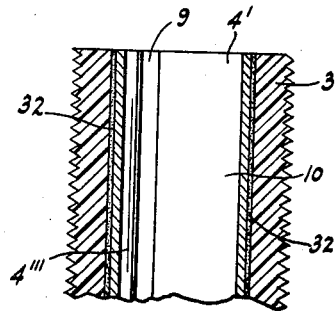
FIG. 10 is a fragmentary vertical sectional view of a portion of the chuck showing still another embodiment of securing means for certain elements thereof.

The metal sleeve 4 in the further modification shown in FIG. 10 is held in place by a suitable strong adhesive, such as an epoxy cement or any other binding material which will cause the metallic sleeve 4 to adhere firmly to the rubber-like sleeve 3.

Although I have described a method of practicing my invention, I contemplate that numerous and extensive departures may be made therefrom without departing from the spirit of my invention and the scope of the appended claims.

I claim:

1. For use with the rotor in the head of a dental handpiece, a chuck comprising a compressible and elastic sleeve provided with radially expansible metallic lining means, said metallic lining means being firmly attached to its enclosing sleeve and having an axial opening slidably and axially to receive the shank of a dental tool and frictionally grip the same for rotation by said handpiece, the elasticity of said elastic sleeve constantly urging said metallic lining means radially into frictional engagement with the shank of a bur when mounted therein.

2. The dental chuck set forth in claim 1 further characterized by said metallic lining means for said compressible sleeve being severed axially so as to be expansible radially a limited amount to receive the shank of a dental tool of slightly larger diameter than that of the opening in said lining sleeve means and said shank frictionally engaging the same.

3. The dental chuck set forth in claim 1 further characterized by said metallic lining means being composed of a plurality of juxtapositioned metallic plates capable of relative radial expansive movement to receive the shank of a drill having a diameter slightly greater than the diameter of the axial opening defined by said metallic plates.

4. The dental chuck set forth in claim 1 further characterized by said metallic lining means being composed of a plurality of similar metallic plates adjacent each other and defining said axial opening, the exposed surfaces of said metallic plates which are engageable with the shank of a dental tool being roughened and said plates being capable of relative expansive movement radially to receive the shank of a drill having a diameter slightly greater than the diameter of the axial opening defined by said metallic plates.

5. The dental chuck set forth in claim 1 further characterized by said metallic lining means being composed of a plurality of similar elongated metallic members, each extending axially within and fixed to said sleeve to define said axial opening, said members being concave in cross-section and the adjacent edges thereof slidably overlapping to permit limited relative radial movement, whereby said metallic members are capable of accommodating the shank of a dental tool having a diameter slightly greater than the diameter of the elongated opening defined by said metallic members.

6. The dental chuck set forth in claim 3 further characterized by said metallic plates having elongated ribs projecting radially from the shank-engageable surfaces thereof, thereby to enhance surface contact between said shank and metallic plates.

References Cited in the file of this patent

UNITED STATES PATENTS

| | | |
|---|---|---|
| 2,622,949 | Cotchett | Dec. 23, 1952 |
| 2,702,730 | Ivanoff | Feb. 22, 1955 |
| 2,873,121 | Hahn | Feb. 10, 1959 |
| 2,917,829 | Page | Dec. 22, 1959 |